Reissued Sept. 10, 1929.

Re. 17,430

UNITED STATES PATENT OFFICE.

JOSEPH BLUMENFELD, OF PARIS, FRANCE, ASSIGNOR, BY MESNE ASSIGNMENTS, TO COMMERCIAL PIGMENTS CORPORATION, A CORPORATION OF DELAWARE.

PREPARATION OF TITANIUM HYDROXIDE.

No Drawing. Original No. 1,504,672, dated August 12, 1924, Serial No. 690,658, filed February 4, 1924. Application for reissue filed June 12, 1928. Serial No. 284,679.

DIVISION B.

The invention relates to the hydrolytic treatment of solutions of titanium oxide in sulfuric acid with the object of preparing the hydroxide of titanium.

Such solutions are obtained by treating titaniferous products or minerals, such as ilmenite, with sulfuric acid.

The chemical composition of these solutions may vary within fairly wide limits. The two most important variables are the concentrations of $TiO_2$ and $H_2SO_4$.

Solutions containing from 100 to 400 grams $TiO_2$ per liter are of the usual strengths to be treated. For a molecule of $TiO_2$ the solution should contain 1–2½ or even more molecules of $H_2SO_4$.

It has now been found that the yield of titanium hydroxide obtained by hydrolytic precipitation of such solutions (heated to about 100° C. during a certain time) as well as its properties, such as the rate of decantation, filtrability, state of subdivision of grain, color after calcination, etc., depend not only on the final state of the system subjected to hydrolytic treatment but they depend also upon certain transformations which the constituents of the solution undergo before and during the precipitation of the titanium dioxide and also upon the way in which this final state of reaction is brought about. In effect, the solution of $TiO_2$ in $H_2SO_4$, brought to a desired concentration either by dilution or by concentration, is heated to the boiling point in order to produce the hydrolysis and becomes opaque after a comparatively long time, but if the content in $H_2SO_4$, combined with $TiO_2$, neglecting other bases, is equal to or exceeds 100 grams per litre, a very poor yield in titanium hydroxide is obtained. Moreover, the precipitate thus obtained, even if possible, is only filtered with great difficulty.

The object of the present invention, therefore is to obtain a satisfactory precipitate (from the point of view of yield, filtrability and other properties) in a short time from solutions of the type mentioned above even in high concentrations.

The invention consists in preparing titanium oxide or hydroxide by hydrolytic precipitation by diffusion of titanium from one solution into another under the action of differential concentration and preferably also temperature.

The invention further consists in preparing titanium oxide or hydroxide by hydrolytic precipitation by diffusion of titanium from one solution into another accelerated by mixing.

The invention also consists in applying the above processes in the presence of other substances so that intimately mixed precipitates are obtained.

Generally, the methods employed are as follows:

(1) The solution obtained by reacting on the titanium material with sulphuric acid, heated to a temperature exceeding 60° C., is covered with a layer of cold water or hot water, either pure or containing such substances as may favor the process such, for example, as $H_2SO_4$, $H_3PO_4$, $Al_2(SO_4)_3$, $SO_2$, or even a solution of titanium salt of a different concentration. The quantity of the liquid added is calculated so as to produce on diffusion or mixing together the desired concentration. The liquid is introduced in such a manner that the two liquids may mix together only gradually, and thus within a certain time there will be a difference in concentrations in different parts of the solution as regards $H_2SO_4$ and $TiO_2$.

(2) In another or modified method the solution is concentrated by evaporating or boiling and may even become thick like a paste. When the necessary quantity of water has been eliminated according to the object, the solution is mixed with a smaller, equal or larger quantity of water than that eliminated. One of the liquids must be at that time at a temperature above 60° C.—usually the concentrated solution. The water may be pure or containing some substances, such as titanium salt or the like. The proportions of the two liquids are selected so as to have the desired concentration, both in $TiO_2$ and $H_2SO_4$, in the final state after the complete mixing. The mixing should be effected fairly quickly in order that the titanium hydroxide does not precipitate appreciably before the homogeneity of the solution is achieved and heating continued.

In both cases the hydrolytic precipitation is terminated at a temperature not far from the boiling point of the solution and in a constant volume. The yield of the precipitate reaches 85–95 per cent in a few hours in the first case and less than in one hour in the second. The various properties mentioned above are greatly improved, such as filtrability as well as the stability of the mother liquor at dilution.

These methods are equally valid when the titanium hydroxide is precipitated in presence of other substances adapted to serve as constituents of paint pigments, (such as $BaSO_4$, $CaSO_4$, $SiO_2$ and the like) with which it is desired to mix it very intimately. The added substances may be prepared separately or in the same apparatus in which the hydrolysis takes place.

*Example 1.*

The solution containing:

| | Gr. per litre. |
|---|---|
| $TiO_2$ | 225 |
| Fe | 50 |
| $H_2SO_4$ total | 440 |

is heated to 95–98° and a layer of cold water is placed on the top in quantity corresponding to about 20 per cent of its volume. This amount of water is sufficient to reduce the total $H_2SO_4$ content to about 367 grams per litre. The mixture of the liquid is facilitated by a gentle agitation. The liquid becomes gradually turbid and then a precipitate falls down. By the end of a few hours the yield of titanium hydroxide is about 94 per cent.

*Example 2.*

The solution containing:

| | Gr. per litre. |
|---|---|
| $TiO_2$ | 180 |
| Fe | 42 |
| $H_2SO_4$ | 460 |

is concentrated by evaporation to half its volume. It then has the consistency of a paste. It is introduced into about twice its own volume of boiling hot water so that the concentration finally will be 300–310 gr. $H_2SO_4$ per litre. The mixing is effected in such a manner as to avoid the immediate coagulation (precipitation) by delaying the mixing from 3 to 5 minutes. It is maintained at boiling temperature, evaporation being prevented. In about half an hour a yield of 85–95 per cent of titanium hydroxide is obtained.

Now, having fully described my invention, I claim the following as new and novel:

1. The preparation of titanium dioxide or hydroxide by hydrolytic precipitation which comprises bringing together a solution of titanium sulfate with a solution of lesser concentration, and retarding the rate of admixture so that the composite liquid first becomes gradually turbid and thereafter throws down the desired precipitate.

2. The preparation of titanium dioxide or hydroxide by hydrolytic precipitation which comprises bringing together a solution of titanium sulfate with water, and retarding the rate of admixture so that the composite liquid first becomes gradually turbid and thereafter throws down the desired precipitate.

3. The preparation of titanium dioxide or hydroxide by hydrolytic precipitation, which comprises covering a solution of titanium sulfate with a layer of solution of lesser concentration so that the composite liquid becomes gradually turbid and thereafter throws down the desired precipitate.

4. The preparation of titanium dioxide or hydroxide by hydrolytic precipitation, which comprises introducing cold water into a warm solution of titanium sulfate in the proportions of about 20% of the volume of the titanium sulfate solution and in such a manner as to form a layer of water upon the titanium sulfate solution.

JOSEPH BLUMENFELD.